No. 759,590. PATENTED MAY 10, 1904.
W. M. BROWN & D. REYNOLDS.
PROCESS OF PRODUCING IRON OR STEEL DIRECT FROM ORE.
APPLICATION FILED NOV. 25, 1903.
NO MODEL.
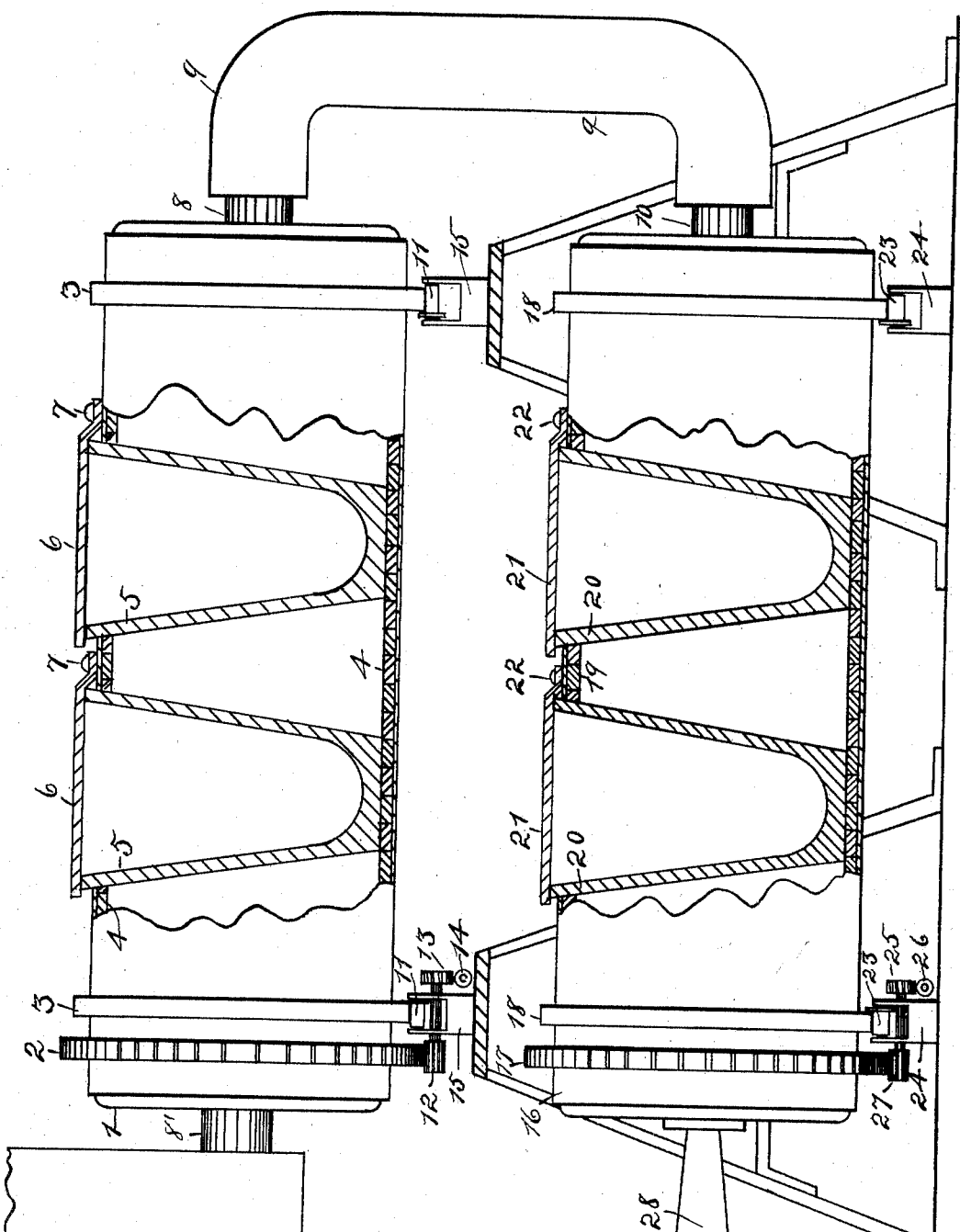
Witnesses:
George W. Newell
Arthur L. Schill
Inventors
Walter M. Brown
Dexter Reynolds No. 759,590. Patented May 10, 1904.

UNITED STATES PATENT OFFICE.

WALTER M. BROWN AND DEXTER REYNOLDS, OF ALBANY, NEW YORK.

PROCESS OF PRODUCING IRON OR STEEL DIRECT FROM ORE.

SPECIFICATION forming part of Letters Patent No. 759,590, dated May 10, 1904.

Application filed November 25, 1903. Serial No. 182,611. (No specimens.)

*To all whom it may concern:*

Be it known that we, WALTER M. BROWN and DEXTER REYNOLDS, both citizens of the United States of America, residing at Albany, New York, have jointly invented certain new and useful Improvements in Processes of Producing Iron or Steel Direct from Ore; and we do hereby declare the following to be a full, clear, and exact description of the invention, such as will enable others skilled in the art to which it appertains to make and use the same, reference being had to the accompanying drawing, and to the figures of reference marked thereon, which forms a part of this specification.

The object of our invention is to provide a new and improved process for the producing of iron or steel direct from the ore.

The drawing shows a side elevation of one form of our furnace arranged to carry out our process, a portion of the shells being broken away to show the interior and arrangement of the same.

Our process consists of mixing granulated oxid-of-iron ore and sufficient granulated carbonaceous material to deoxidize the ore and carbonize the iron in it to the extent required to produce the grade of iron or steel desired; introducing this mixture into revoluble crucibles preferably set in a revoluble shell or furnace; heating this shell or furnace by the waste products of combustion coming from the melting or fusing furnace; revolving the crucibles in order to thoroughly mix and continually stir the mixture of oxid of iron and the carbonaceous material, so that the particles shall make as many points of contact as possible in order to take advantage of the well-known principle that deoxidation and carbonization take place only at the point of contact; continuing this stirring and mixing and the heating of the crucibles until the iron in the ore is deoxidized and carbonized to the desired extent and during this deoxidizing and carbonizing process protecting the mixture in the crucibles from the direct action of the products of combustion used in heating the crucibles and their contents in order that there shall be no deleterious effects from the products of combustion upon the mixture during the process of deoxidation and carbonization; after deoxidation and carbonization have taken place to the desired extent then at a suitable time adding to the mixture flux sufficient in quantity and quality to remove impurities. If the flux is entered in crucibles 5, we then revolve the crucibles containing this mixture and empty the mixture into other revoluble crucibles, (which may be fully or only partly revoluble, if desired,) said second set of crucibles being set in a melting or fusing furnace that is itself wholly or partly revoluble and heating this furnace until the mixture is fused or melted and then revolving said crucibles containing the melted mass so as to empty them into any desired receptacle or receptacles, the crucibles being arranged so that the contained mixture is protected from the direct action of the products of combustion of the melting or fusing furnace. If the flux is entered in the crucibles 20 instead of in crucibles 5, then crucibles 20 are revolved before melting takes place, so that the flux shall be thoroughly mixed with the other ingredients.

The operation and the form of furnace shown herein are described as follows.

The numeral 1 shows a metallic shell having openings through it in which are set the refractory crucibles 5, so as to be removed when desired should they become worn out or broken, the shell 1 being lined with fire-brick, preferably as seen at 4. Crucibles 5 are covered with a movable cover 6, movable by means of the pivot or pin 7, so they may be opened and closed at will. The shell 1 has a gear 2 and rings 3 3, as seen. The gear 2 meshes with a small gear 12, operated by a worm-gear 13 and worm 14 from any desired source of power.

15 shows a channeled base having the roller 11 operatively in connection therewith, upon which the ring 3 rests and revolves.

It is evident that when the worm 14 is revolved the worm-gear 13, the gears 12 and 2 will also revolve, revolving the shell 1 and crucibles 5.

In this shell above described the first steps of our process are carried out as follows: The granulated oxid-of-iron ore and the granulated carbonaceous material are preferably first more or less mixed and then placed in the crucibles 5, filling them only partly. The shell 1, with its crucibles 5, is then set in revolution, which rolls and tumbles the mixture in the crucibles, stirring it constantly, making as many points of contact as possible between the particles of oxid of iron and the particles of carbonaceous material, while the waste products of combustion from the furnace 16 passes about the crucibles 5 and heats them to a temperature sufficient to produce deoxidation and carbonization of the iron to an extent proportional to the amount of carbon in the mixture—i. e., if a certain grade of steel or iron is desired only so much of carbonaceous material as will deoxidize the iron and produce that grade is placed in the crucibles 5 with the oxid-of-iron ore. While the products of combustion from the melting or fusing furnace is passing from the melting-furnace 16 through pipe 9 and revoluble necks 10 and 8 into shell 1 and through it the crucibles 5 protect the mixture from all contact with the products of combustion, and thus any excess of atmosphere that may be carried by the products of combustion cannot affect the mixture in the crucibles in any manner except to heat it. As soon as the iron in the ore is suitably deoxidized and carbonized the shell 1 is revolved so that the mouths of the crucibles 5 will pour their contents into the crucibles 20 in the shell or furnace 16, and the covers 21 by means of the pivots 22 are swung shut. The burner 28 is designed to use powdered coal or dust, (but we do not confine ourselves to the use of that form of fuel, as oil or gas fuel or any other may be used, if desired,) and an initial fire being started in the furnace 16 the dust is blown in and creates a heating flame and a very high temperature, which passing among the crucibles 20 heats them sufficiently to melt their contents without the products of combustion coming into contact with the melting mixture, the shell being protected by fire-brick 19. While the melting process is proceeding the furnace 16 will stand stationary, while shell 1 will be revolving, the crucibles 5 having been immediately recharged with a fresh charge of the mixture. When the fusing of the mixture in crucibles 20 is completed, shell 16 is revolved sufficiently so as to allow of the removal of the slag and of pouring the balance of the contents of the crucibles into ingot-molds or other receptacles. In this manner the crucibles in both shells 1 and 16 are never removed or exposed to the outside atmosphere while heated and are not disturbed in any manner except to be revolved when desired, and they therefore are enabled to perform their functions for long periods without unnecessary deterioration. The necks 8 and 10 and 8' are fixed to their respective shells and revolve in the ends of the pipe 9 and 8' in the stack preferably. When the fused mass is poured from the crucibles 20, the furnace is revolved entirely, which brings the crucibles upside down, when all waste matter will be emptied and the further revolution will bring them upright again, so they may receive the next charge from the crucibles 5. This furnace is therefore practically continuous in its operation.

Having described our invention so that those skilled in the art may know how to make and use the same, what we claim, and desire to secure by Letters Patent, is—

The process of producing iron and steel direct from the ore consisting of mixing granulated oxid-of-iron ore with granulated carbonaceous material in quantity and quality sufficient to deoxidize the ore and carbonize the iron to the grade of iron or steel desired; heating the mixture by the heat only of waste products of combustion, and stirring and intermixing the mixture while being thus heated, and protecting it from contact with said products of combustion, except the heat, and from contact with the atmosphere until the iron is deoxidized and suitably carbonized; after deoxidation and carbonization has taken place, introducing into the mixture flux sufficient in quantity and quality to remove impurities; heating the mixture by means of the heat from an initial source of heat and at the same time protecting the mixture from contact with the rest of the products of combustion and from the atmosphere, until melting or fusion of the iron results, the waste products used being from the initial source of heat substantially as described.

In testimony whereof we affix our signatures in presence of two witnesses.

WALTER M. BROWN.
DEXTER REYNOLDS.

Witnesses:
J. F. HARRIS,
HENRY J. DOYLE.